UNITED STATES PATENT OFFICE.

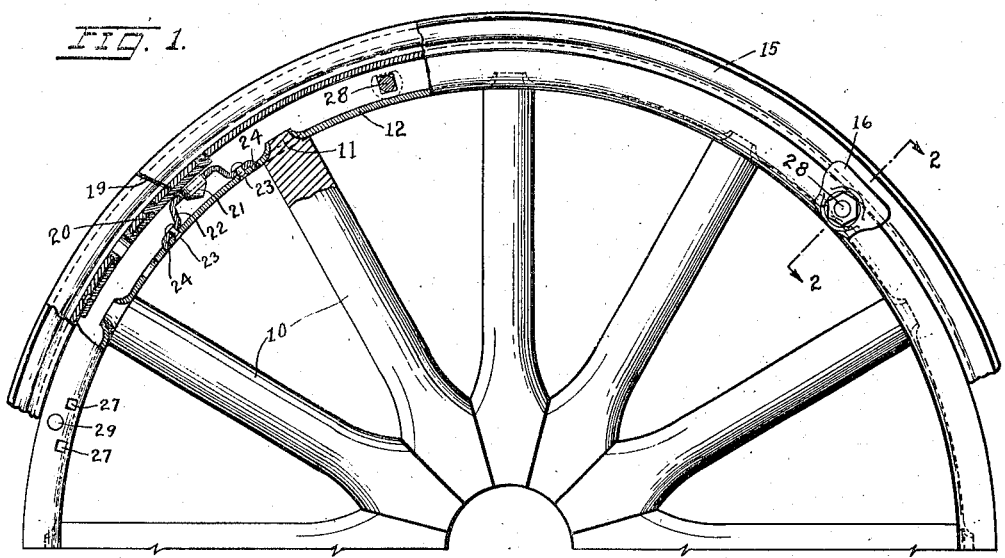
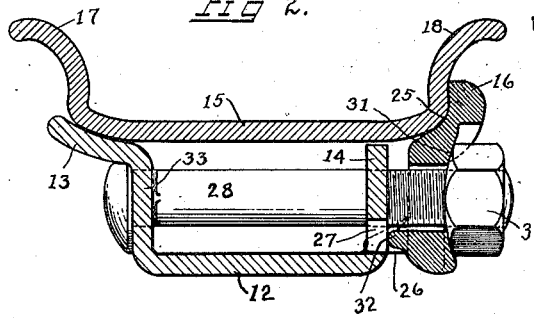
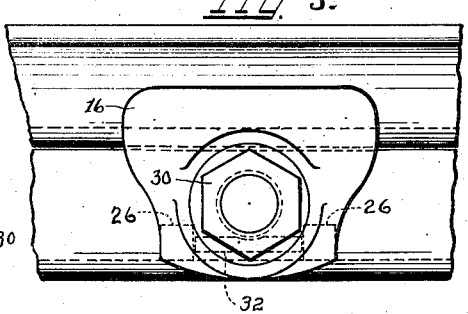
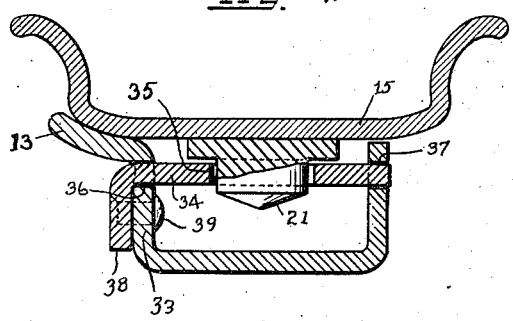
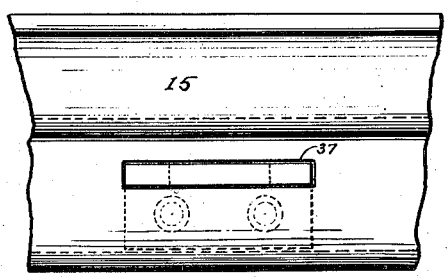
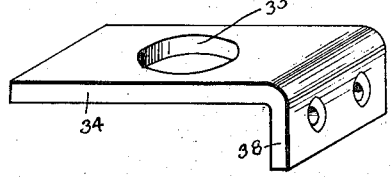

OTTO H. JOBSKI, OF CLEVELAND, OHIO, ASSIGNOR TO THE STANDARD PARTS COMPANY, OF CLEVELAND, OHIO, A CORPORATION OF OHIO.

WHEEL.

1,402,511.   Specification of Letters Patent.   Patented Jan. 3, 1922.

Application filed October 14, 1918. Serial No. 257,929.

*To all whom it may concern:*

Be it known that I, OTTO H. JOBSKI, a citizen of the United States, and a resident of Cleveland, county of Cuyahoga, State of Ohio, have invented certain new and useful Improvements in Wheels, of which the following is a specification.

This invention relates to wheels and more particularly to motor vehicle wheels.

It is one of the objects of the invention to provide a wheel having wood spokes and an annular channeled metal member, herein referred to as a metal felly, which is adapted to take the place of the wood felly and the fixed rim usually employed and to receive a demountable tire-carrying rim of standard form. Another object of the invention is to provide a wheel construction that will be easy and comparatively inexpensive to manufacture, and which will have the requisite strength and other qualities necessary to meet the requirements in connection with motor vehicles.

Other objects and the features of novelty will be apparent from the following description, taken in connection with the accompanying drawings of which;

Figure 1 is a fragmentary side elevation of a wheel embodying the invention, certain parts being shown in section;

Figure 2 is a transverse section on the line 2—2 of Figure 1;

Figure 3 is a developed side elevation of Figure 2;

Figure 4 is a view similar to Figure 2 but showing a modification;

Figure 5 is a developed side elevation of the construction shown in Figure 4; and Figure 6 is a perspective view of a detail of the construction shown in Figures 4 and 5.

Referring to the drawings it will be noted that the spokes of the wheel are indicated at 10 and that they are provided at their outer ends with tenons 11 which fit into outwardly flanged perforations in the inner wall 12 of the fixed rim, the latter being preferably formed of sheet metal and being of channel shape, cross-section, as shown in Figures 2 and 4, and one side of the channel having the inclined flange 13 formed on the outer edge thereof. The other side 14 of the channel has a plain outer edge and a tire base 15 has one side thereof seated on the flange 13 and the other side supported radially and laterally by a series of clamps 16.

The tire base 15 illustrated in the drawings is of a standardized type having integral side flanges 17 and 18 and being split at the point 19 and having its ends secured together by suitable latching means, indicated generally by the numeral 20, the details of which form no part of the present invention. A driving member or stud 21 projects inwardly from the tire base 15 and in Figure 1 this drive member cooperates with a member 22 on the fixed rim, the member 22 being preferably secured by means of rivets 23, and by having one or both of its ends arranged in suitable perforations as indicated at 24. The interengagement of the driving members 21 and 22 prevent relative circumferential movement of the fixed rim and the tire base.

Each of the clamps 16 has its outer edge suitably formed to fit the corner 25 of the tire base 15 and has adjacent its inner edge one or more lateral projections 26, there being preferably two such projections as shown in Figure 3, which enter suitable perforations 27 in the side of the fixed rim adjacent the inner wall 12. Bolts 28 extend through suitable openings in the side walls of the fixed rim between and outwardly of each pair of openings 27, as indicated at 29 in Figure 1, these bolts passing through the clamps 16 and being provided with nuts 30 which engage by preference with spherically formed seats 31 on the clamps for the purpose of securing the tire base 15 on the fixed rim. It will be noted from Figure 2 that there is a small bead 32 on the clamp 16, between the projections 26, and that this bead bears against the outer face of the wall 14 of the fixed rim and acts as a fulcrum about which the clamp is rocked when being tightened against the tire base 15. It will also be noted that the bead 32 bears against the wall 14 substantially at the corner between this wall and the wall 12, so that the latter wall takes the reaction from the clamp and there is very little tendency to draw the sides of the fixed rim together. The reaction between the bolts 28 and the wall 33 of the fixed rim is counterbalanced by the lateral pressure of the tire base 15 on the flange 13. It, therefore, appears that the lateral stresses to which the fixed rim is subjected are so distributed that there is very little tendency to draw the sides of the fixed rim together, and spacers, such as it has been found necessary heretofore to use between the side walls of the metal fellies, are not necessary.

Referring to the modification shown in Figures 4, 5 and 6, it will be seen that this consists of an angle bar 34 having a perforation 35 for the stud 21 and having its ends extending through perforations 36 and 37 in the side walls of the fixed rim, the leg 38 of the angle bar being arranged on the exterior of the wall 33 of the fixed rim and secured thereto by rivets 39.

The details of the construction of the inner ends of the spokes are not shown as they form no part of the present invention, and in practicing the invention I would prefer to conform to the principles of spoke design and assembling laid down in United States Patents 350,176 to Warwick and 717,404 to Hopper, and in the French Patent 355,850 to Rousselot.

Having thus described my invention what I claim is:

1. In wheel construction, the combination of a channel shaped rim comprising a bottom wall and lateral walls, one of said lateral walls having an outwardly inclined flange and the other lateral wall having spaced openings therein adjacent the bottom wall, a demountable rim having one side thereof seated on said flange, clamps having a fulcrum engaging the other side of said rim and having portions on opposite sides of said fulcrum entering said openings in the lateral wall and engaging the bottom wall for supporting said demountable rims radially, and bolts cooperating with said clamps.

2. In wheel construction, the combination of an annular channeled member having an inclined flange on one side and openings arranged circumferentially spaced pairs in the side opposite said flange, a rim demountably seated on said flange, clamps having their outer edges engaging said rim and provided with spaced projections adjacent their inner edges entering said openings, the inner face of the clamps between said projections engaging the side of said channeled member, bolts cooperating with said clamps at points outwardly of and between said projections, and interengaging means on said channeled member and rim for locking the same together against relative circumferential movement.

In testimony whereof I affix my signature.

OTTO H. JOBSKI.